United States Patent [19]
Hutchinson

[11] 3,790,856
[45] Feb. 5, 1974

[54] OVERVOLTAGE PROTECTION CIRCUIT FOR DUAL OUTPUTS OF OPPOSITE POLARITY

[75] Inventor: Homer F. Hutchinson, Wheaton, Ill.

[73] Assignee: GTE Automatic Electric Laboratories Incorporated, Northlake, Ill.

[22] Filed: June 4, 1973

[21] Appl. No.: 367,064

[52] U.S. Cl. ................ 317/16, 317/31, 317/33 SC, 317/46, 323/8
[51] Int. Cl. ............................................. H02h 3/20
[58] Field of Search 307/202, 252 K, 252 L; 317/16, 317/31, 33 SC, 33 VR, 46; 323/8, 23, 25

[56] References Cited
UNITED STATES PATENTS 3,286,155  11/1966  Corey ............................ 307/252 L
3,341,763  9/1967  Noddin .......................... 317/33 SC
3,475,653  10/1969  Odenberg et al. ..................... 317/16

Primary Examiner—A. D. Pellinen
Attorney, Agent, or Firm—L. N. Arnold

[57] ABSTRACT

An overvoltage protection circuit for two output circuits having output voltages of opposite polarity relative to ground includes a crowbar overvoltage protection circuit for each of the outputs, each comprising a thyristor which is triggered by a zener diode which becomes conductive if the voltage of the output exceeds a predetermined value. The two crowbar circuits are interconnected so that triggering of either of the thyristors will trigger the other thyristor and clamp both output circuits to approximately ground potential.

11 Claims, 1 Drawing Figure

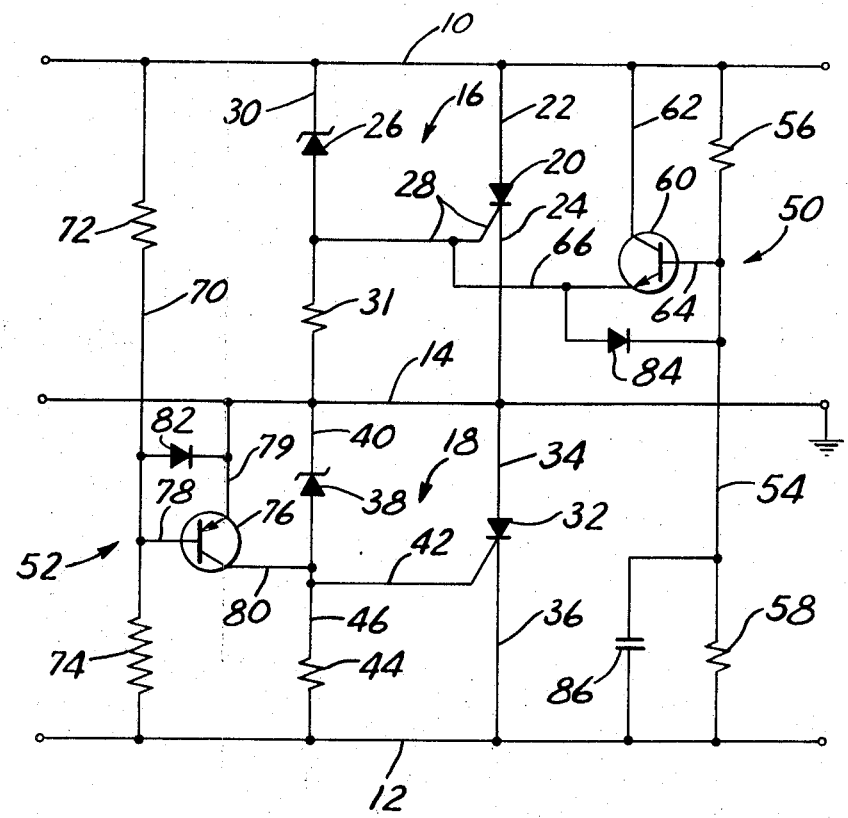

OVERVOLTAGE PROTECTION CIRCUIT FOR DUAL OUTPUTS OF OPPOSITE POLARITY

The present invention generally relates to overvoltage protective circuits and, more particularly, to overvoltage protection circuitry involving what are commonly referred to as overvoltage protection crowbar circuits.

Overvoltage protection crowbar circuits which typically incorporate a thyristor means, such as a silicon controlled rectifier having an anode connected to a high potential output lead and a cathode connected to a low potential output lead with a control terminal connected to the high potential output lead through a reference diode, are well known and widely described in the electronic literature. The reference diode is typically chosen so that its avalanche or breakdown characteristic is compatible with the voltage existing in the output circuit so that it will be normally nonconducting when the voltage level fails to exceed the designed output value.

In the event of an overvoltage condition, the reference diode becomes conductive and conducts current to the control terminal of the thyristor means, triggering it into conduction to clamp the output to a low value. Since only two components are utilized for such overvoltage protection, the use of such crowbar circuits are convenient and relatively inexpensive and provide adequate protection for many circuit applications. However, since the output is effectively short-circuited, disregarding the inherent voltage drop through the SCR or thyristor itself, it must be capable of conducting substantially the full load current, and such crowbar circuits are generally used in circuit applications where the output load currents are not excessive for sucn thyristors.

It is quite common for a power supply or the like to have more than one output to be protected, and may have two outputs where the output voltages are even of opposite polarity. If, for example, a dual voltage power supply having outputs of opposite polarity relative to ground supplies power to an overall system, and an overvoltage condition occurs in one of the outputs, an overvoltage protection crowbar circuit would protect that output, but would typically have no effect on the other output and such a condition could have extremely undesirable results. The loss of one of the outputs could result in the lack of proper biasing of various circuit components, for example, which would turn them on and conceivably cause excessive heat dissipation and damage to components in the circuitry.

Accordingly, it is a primary object of the present invention to provide an improved overvoltage protection circuit for use with dual outputs of opposite polarity which utilizes overvoltage protection crowbar circuits and interconnecting networks which actuate the remaining one of the crowbar circuits in response to the activation of the other of the crowbar circuits.

Other objects and advantages of the present invention will become apparent upon reading the following detailed description, while referring to the attached drawing which is an electrical schematic diagram of the improved overvoltage protection circuit embodying the present invention.

Referring to the drawing, an embodiment of the present invention is shown to include a positive potential output lead 10, a negative potential output lead 12, as well as a ground potential lead 14. It should be realized that the left terminals of the output leads may be attached to the output leads of a power supply or the like which is to be protected against an overvoltage condition, and load conductors may be connected to the right lead terminals. Both the positive output (measured between the positive lead 10 and ground lead 14) and the negative output (measured between the negative output 12 and ground 14) are protected against an overvoltage condition by individual crowbar circuits, indicated generally at 16 and 18, respectively.

The positive output crowbar circuit 16 comprises a thyristor means illustrated as a silicon controlled rectifier (SCR) 20 having an anode connected to the positive output lead 10 through a lead 22 and a cathode connected to ground through a lead 24. A control terminal is connected to the anode of a reference diode 26 through a lead 28, and the cathode of the reference diode 26 is connected to the positive output lead 10 through a lead 30. The anode of the diode 26 is also connected to ground lead 14 through a resistor 31. The reference diode, typically a Zener diode or similar breakdown or avalanching device, is chosen so that it is normally nonconductive when the value of the voltage in the positive output lead 10 does not exceed its design value. If, for example, the positive output is about +5 volts d.c., a reference diode which will conduct if the voltage exceeds about 5.6 volts may be used so that if the output voltage exceeds the breakdown voltage of the reference diode 26, it will conduct current through the leads 30 and 28 to the control terminal of the SCR 20 and trigger it into conduction which will effectively clamp the voltage in the positive output lead 10 to a low value, for example, about 1 to 1.5 volts.

More specifically with respect to the negative output crowbar circuit 18, an SCR 32 has an anode connected to ground lead 14 through a lead 34 and a cathode connected to the negative output lead 12 through a lead 36. A reference diode 38 is provided and has a cathode connected to ground lead 14 through a lead 40 and an anode connected to the control terminal of SCR 32 through a lead 42.

The anode voltage of reference diode 38 is essentially the voltage of the negative output lead 12 and is applied thereto through a resistor 44 located in a lead 46. Thus, if the voltage on the cathode of the reference diode 38 is more positive with respect to the anode voltage and the difference exceeds the breakdown value thereof, reference diode 38 will conduct current through lead 42 to trigger SCR 32 and clamp the negative output to a low numerical value, such as approximately −1 to −1.5 volts.

More specifically, if the negative output is nominally −9 volts, the reference diode 38 may be chosen so that its breakdown voltage is 10 volts and would thus conduct current when the output voltage in lead 12 numerically increased, to a value in excess of −10 volts. Since the reference diode 38 would breakdown and conduct if the voltage difference between its cathode and anode exceeded 10 volts, it is easily seen that the negative output voltage in lead 12 going more negative relative to ground potential accomplishes the same result with respect to this reference diode 38 as in the crowbar circuit 16 where the positive output voltage increases relative to ground potential. From the foregoing description of the crowbar circuits 16 and 18, it should be understood that each of them is effective to clamp its associated output to a low value if an overvoltage condition occurs.

In accordance with an important aspect of the present invention, provision is made for cross coupling or interconnecting the two separate crowbar circuits so that the other of the crowbar circuits will be triggered in the event the first is triggered. Such triggering of the remaining crowbar circuit will be effected regardless of which one is initially triggered and the net result is a clamping of both outputs to approximately ground potential. Since the SCRs within each of the crowbar circuits will have a nominal voltage drop thereacross during conduction, the outputs will only approach ground potential, for example, to within approximately 1 to 1.5 volts.

To provide the cross coupling for the two crossbar circuits 16 and 18, two cross coupling networks, indicated generally at 50 and 52, are provided. The cross coupling network 50 is adapted to activate crowbar circuit 16 if crowbar circuit 18 is initially activated due to an overvoltage condition on the negative output lead 12 and, similarly, the cross coupling network 52 is adapted to activate crowbar circuit 18 in the event crowbar circuit 16 is initially activated in response to an overvoltage condition on the positive output lead 10.

Broadly stated, the cross coupling networks include voltage dividers which are connected to the output leads 10 and 12 and which control associated transistors which are biased in a nonconductive condition when the voltage levels of the outputs are within the desired design limits. In the event one of the crowbar circuits is activated, the voltage levels within the voltage divider are changed and this causes the transistor associated with the nonactivated crowbar circuit to be biased into conduction and activate the remaining crowbar circuit so that both outputs are clamped to a low value.

More specifically, and turning to the cross coupling network 50, a lead 54 interconnecting output leads 10 and 12 includes resistors 56 and 58 which are valued so that the voltage between the resistors is approximately zero when the output voltages are at the desired magnitude. A transistor 60 has a collector connected to positive output lead 10 through a lead 62, a base connected through a lead 64 to lead 50 intermediate the two resistors 56 and 58 and an emitter connected to the control terminal of SCR 20 through a lead 66 and the lead 28. Since the base of transistor 60 is normally at about zero volts if the voltages of both outputs are at about their design values, and since the emitter is also at approximately the same value, transistor 60 will be non-conductive during normal operation, i.e., when the levels of the voltages within the output leads 10 and 12 are at their proper values. However, in the event crowbar circuit 18 is activated and clamps the negative output lead 12 to a low value, for example, about −1 to −1.5 volts, the base of transistor 60 will no longer be at approximately zero volts and will in fact increase to a positive value sufficient to bias transistor 60 into conduction which will cause current flow through the collector-emitter path thereof which is conducted to the control terminal of SCR 20 to trigger it into conduction. Since the activation of crowbar circuit 18 resulted in transistor 60 becoming conductive and triggering SCR 20, it is seen that both crowbar circuits 16 and 18 are activated. It is noted that transistor 60 is a npn-transistor so that current will flow out of the emitter to the control terminal of the SCR 20 to trigger the same when transistor 60 become conductive.

With respect to the operation of the cross coupling network 52, another voltage divider is provided and comprises a lead 70 connecting the positive and negative output leads 10 and 12 and includes resistors 72 and 74 therein. The base of a transistor 76 is connected between the two resistors through a lead 78. As was the case with respect to the cross coupling network 50, the base voltage of transistor 76 is approximately zero when the values of the resistors are properly determined and the voltage levels on the output leads are at about their desired magnitudes. The emitter of transistor 76 is connected to the ground lead 14 through a lead 79 and the collector is connected to the control terminal of SCR 32 through a lead 80 and the lead 42. Transistor 76 is a pnp-transistor so that when it becomes conductive, current will flow in the direction out of the collector and into the leads 80 and 42 to supply current to trigger SCR 32.

Since, during normal operation, i.e., the output voltages are approximately at their desired magnitudes, the base as well as the emitter of transistor 76 will be approximately at ground potential and the transistor will be non-conductive. However, in the event an overvoltage condition occurs in the positive output lead 10 which is sufficient to activate the crowbar circuit 16, the level of the positive output voltage will be reduced to a low value and the base voltage of transistor 76 will become more negative and thereby bias transistor 76 into conduction, resulting in current flow out of the base as well as the collector, and the collector current will trigger SCR 32 into conduction.

From the foregoing description of the cross coupling networks 50 and 52, it is seen that both crowbar circuits will be activated in response to an overvoltage condition occuring in either of them that is sufficient to activate one of the crowbar circuits.

In keeping with the present invention, a diode 82 having its anode connected to the base of transistor 76 and a cathode connected to the emitter thereof may be provided to protect transistor 76 in the event the output voltages should become sufficiently high to damage the resistors 72 and 74 would could then damage transistor 76. Similarly, a diode 84 may be provided to protect transistor 60 and has an anode connected to the emitter and a cathode connected to the base thereof. Additionally, a capacitor 86 may optionally be connected in parallel with resistor 58 for the purpose of stopping oscillations which may occur when the crowbar circuit 16 is activated.

From the foregoing description of the overvoltage protective circuitry embodying the present invention, it should be understood that two outputs having voltages of opposite polarity can be clamped to approximately ground potential in the event an overvoltage condition occurs in either of the outputs. The interconnection or cross coupling of the crowbar circuits achieves the desired result by using a small number of relatively inexpensive components.

It is, of course, understood that although a preferred embodiment of the present invention has been illustrated and described herein, there are modifications which will be apparent to those skilled in the art; and, accordingly, the scope of the present invention should be defined only by the appended claims and equivalents thereof.

Various features of the invention are set forth in the following claims.

What is claimed is:

1. An overvoltage protective circuit for two output circuits having output voltages of opposite polarity, comprising:

a first output clamping means comprising a thyristor means having an anode connected to the positive output lead, a cathode connected to ground and a control terminal connected to said positive output lead through a reference diode, so that when the voltage in said positive output lead exceeds a predetermined value said reference diode conducts current to trigger said thyristor means into conduction and said positive output lead is clamped to approximately ground potential;

a second output clamping means comprising a thyristor means having an anode connected to ground, a cathode connected to the negative output lead, and a control terminal connected to ground through a reference diode, so that when the voltage in said negative output lead exceeds a predetermined value said reference diode conducts current to trigger said thyristor means into conduction and said negative output lead is clamped to approximately ground potential; and, means interconnecting said first and second clamping means for triggering the thyristor means of one of said clamping means in response to triggering of the thyristor means of the other of said clamping means.

2. An overvoltage protective circuit as defined in claim 1 wherein said interconnecting means comprises a first transistor associated with said first clamping means and a second transistor associated with said second clamping means, each of said transistors being normally nonconductive and having a base connected between resistance means located in a lead extending between said positive and negative output leads, said resistance means defining a voltage divider, the collector-emitter path of said first and second transistors being respectively connected to the control terminal of the thyristor means associated with said first and second clamping means, so that clamping of the voltage level of either of said positive and negative output leads to approximately ground potential changes the voltage level in said voltage dividers and biases the transistor associated with the unclamped clamping means into conduction to trigger the other of said thyristor means and thereby clamp both outputs to approximately ground potential.

3. An overvoltage protective circuit as defined in claim 2 wherein said first transistor is an npn-transistor having a collector connected to said positive output lead and an emitter connected to said control terminal of said first thyristor means.

4. An overvoltage protective circuit as defined in claim 2 wherein said second transistor is a pnp-transistor having an emitter connected to said ground lead and a collector connected to said control terminal of said second thyristor means.

5. An overvoltage protective circuit as defined in claim 3 including a protective diode having an anode connected to the emitter of said first transistor and a cathode connected to the base thereof.

6. An overvoltage protective circuit as defined in claim 4 including a protective diode having an anode connected to the base of said second transistor and a cathode connected to the emitter thereof.

7. An overvoltage protective circuit as defined in claim 2 including a capacitor connected between said negative output lead and the base of said first transistor.

8. A cross coupled overvoltage protection circuit for a dual voltage power supply or the like having two outputs, the output voltages in the output leads being of opposite polarity relative to ground potential, comprising:

a first crowbar circuit connected in the positive voltage output and comprising first thyristor means having an anode connected to the positive voltage output lead, a cathode connected to the ground lead and a control terminal connected to the positive voltage output lead, a reference diode connected in said control lead so that if the voltage on said positive output lead exceeds a predetermined value will cause said reference diode to conduct and trigger said thyristor means and clamp said positive output lead to approximately ground potential;

a second crowbar circuit connected in said negative output lead and comprising a second thyristor means having an anode connected to said ground lead, a cathode connected to said negative output lead and a control terminal connected to said ground lead, a reference diode connected in said control lead so that if the voltage on said negative output lead exceeds a predetermined value will cause said reference diode to conduct and trigger said thyristor means into conduction and clamp the value of the voltage in said negative output lead to approximately ground potential; and, means interconnecting said crowbar circuits to trigger the other thyristor means in the event one of said thyristor means is triggered, to thereby clamp both outputs to approximately ground potential in the event an overvoltage condition occurs in either of said output leads.

9. A cross coupled overvoltage protection circuit as defined in claim 8 wherein said interconnecting means comprises first and second transistors respectively associated with said first and second crowbar circuits, each of said transistors being nonconductive when said thyristors are nonconductive, each of said transistors having its base connected intermediate resistance means connected in respective leads extending between said positive and negative output leads, said resistance means defining a voltage divider that is balanced so that the bases of each of said transistors are approximately at zero potential when said thyristor means are nonconductive, the collector-emitter path of said first and second transistors being respectively connected to the control terminal of said first and second thyristor means, the triggering of one of said thyristor means in response to an overvoltage condition on the output lead in which the crowbar circuit is located causing a voltage change in the voltage dividers which biases the transistor associated with the other crowbar circuit into conduction to trigger the other thyristor means and thereby clamp both outputs to approximately ground potential.

10. A cross coupled overvoltage protection circuit as defined in claim 8 wherein said first transistor is an npn-transistor having a collector connected to said positive output lead and an emitter connected to said control terminal of said first thyristor means.

11. A cross coupled overvoltage protection circuit as defined in claim 8 wherein said second transistor is a pnp-transistor having an emitter connected to said ground lead and a collector connected to said control terminal of said second thyristor means.

* * * * *